United States Patent
Yamada

(10) Patent No.: US 9,614,667 B2
(45) Date of Patent: Apr. 4, 2017

(54) INFORMATION PROCESSING APPARATUS AND METHOD THEREFOR

(71) Applicant: CANON KABUSHIKI KAISHA, Tokyo (JP)

(72) Inventor: Shinya Yamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 14/589,370

(22) Filed: Jan. 5, 2015

(65) Prior Publication Data
US 2015/0200772 A1    Jul. 16, 2015

(30) Foreign Application Priority Data

Jan. 14, 2014  (JP) .................................. 2014-004611
Nov. 19, 2014  (JP) .................................. 2014-234910

(51) Int. Cl.
*H04L 9/06* (2006.01)
*G09C 1/00* (2006.01)

(52) U.S. Cl.
CPC .............. *H04L 9/0637* (2013.01); *G09C 1/00* (2013.01); *H04L 2209/04* (2013.01)

(58) Field of Classification Search
CPC .. H04L 9/0637; H04L 9/0631; H04L 2209/04
See application file for complete search history.

(56) References Cited

U.S. PATENT DOCUMENTS

| | | | |
|---|---|---|---|
| 2003/0065925 A1* | 4/2003 | Shindo | G06F 21/10 713/178 |
| 2003/0231770 A1* | 12/2003 | Nishikawa | H04N 1/4486 380/213 |
| 2006/0026442 A1* | 2/2006 | Ittogi | H04L 9/3242 713/189 |
| 2009/0060197 A1* | 3/2009 | Taylor | H04L 9/0618 380/277 |
| 2011/0123020 A1* | 5/2011 | Choi | H04L 9/0637 380/28 |

(Continued)

FOREIGN PATENT DOCUMENTS

JP    2012-009928 A    1/2012

OTHER PUBLICATIONS

Morris Dworkin, "Recommendation for Block Cipher Modes of Operation: The XTS-AES Mode for Confidentiality on Storage Devices", NIST National Institute of Standards and Technology, Special Publication 800-38E, Jan. 2010, pp. 1-10.

*Primary Examiner* — Yonas Bayou
(74) *Attorney, Agent, or Firm* — Carter, DeLuca, Farrell & Schmidt, LLP

(57) ABSTRACT

A plural number M (M≥2) of block cipher encryption units perform, in a block order, either encryption processing or decryption processing for data of a series of blocks each having a predetermined data size and included in a data unit. The plural number of block cipher encryption units perform either encryption of decryption for the data unit by repeating processing in the block order. Every time processing of a data unit starts, a block cipher encryption unit configured to process the data of the nMth (nM<N, N represents a block count) block in nth (n≥1) processing generates an initial mask value to be used for the encryption or decryption.

16 Claims, 5 Drawing Sheets

(56) References Cited

U.S. PATENT DOCUMENTS

| | | | | |
|---|---|---|---|---|
| 2011/0271121 A1* | 11/2011 | Imamoto | ............ | G11B 20/0021 |
| | | | | 713/193 |
| 2011/0311048 A1* | 12/2011 | Nagata | .................. | H04L 9/0894 |
| | | | | 380/252 |
| 2012/0069993 A1* | 3/2012 | Fujisaki | ................ | H04L 9/0637 |
| | | | | 380/28 |
| 2012/0230492 A1* | 9/2012 | Fujisaki | ................ | H04L 9/0637 |
| | | | | 380/277 |
| 2012/0331305 A1* | 12/2012 | Ishikawa | ................ | G06F 21/72 |
| | | | | 713/189 |
| 2014/0105402 A1* | 4/2014 | Taban | .................. | H04L 9/0861 |
| | | | | 380/278 |
| 2015/0058639 A1* | 2/2015 | Hasegawa | ................ | G06F 21/85 |
| | | | | 713/190 |
| 2015/0381582 A1* | 12/2015 | O'Hare | ................ | G06F 21/606 |
| | | | | 713/189 |

* cited by examiner

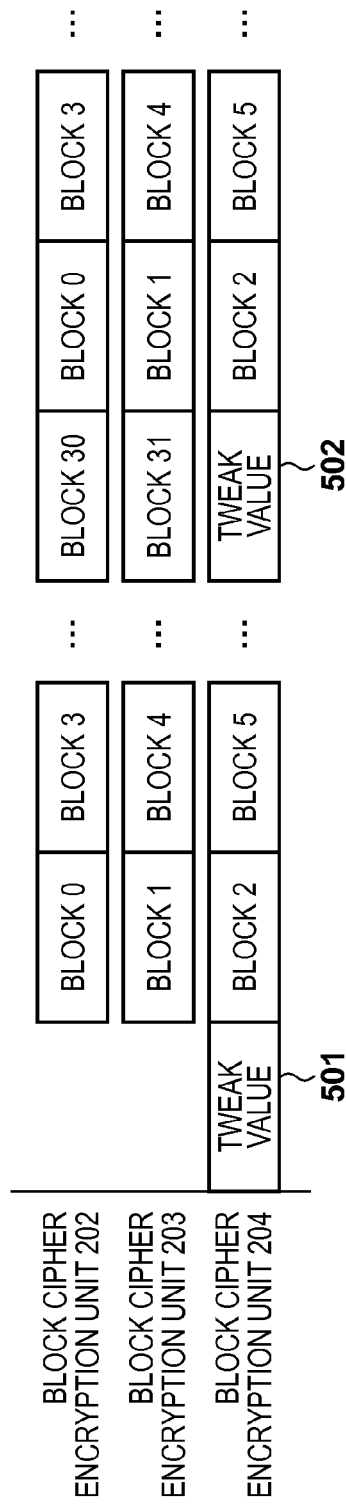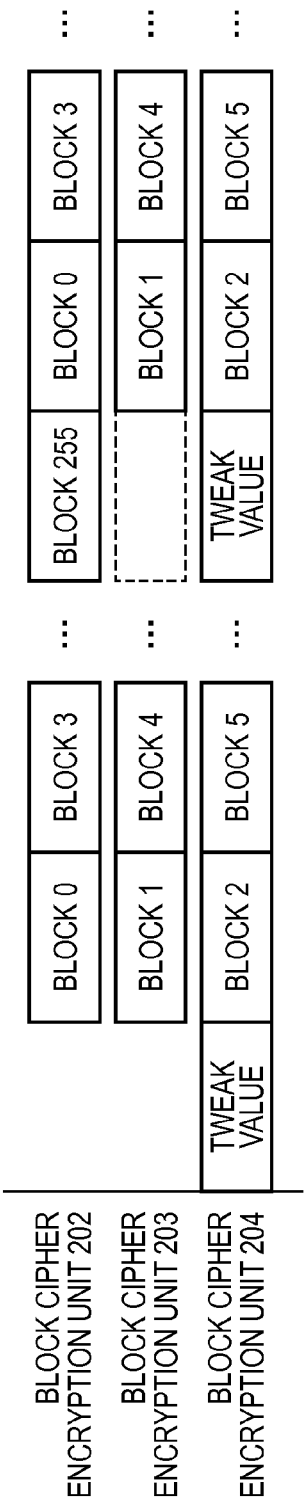

INFORMATION PROCESSING APPARATUS AND METHOD THEREFOR

BACKGROUND OF THE INVENTION

Field of the Invention

The present invention relates to information processing of performing cipher processing.

Description of the Related Art

IEEE (The Institute of Electrical and Electronics Engineers, Inc.) standardizes XEX (Xor-encrypt-xor)-based tweaked-codebook mode with ciphertext stealing-Advanced Encryption Standard (XTS-AES) as an encryption algorithm for a storage device such as a hard disk. Furthermore, NIST (National Institute of Standards and Technology) recommends XTS-AES as storage encryption.

XTS-AES is an algorithm of individually performing cipher processing for each 128-bit block, and can perform cipher processing at higher speed by causing cipher processors to operate in parallel.

In XTS-AES, it is necessary to generate an initial mask value from a tweak value before the start of cypher processing of a 128-bit block (to be simply referred to as a "block" hereinafter). Therefore, it is impossible to start the cipher processing of the block while the initial mask value is generated. Since cipher processing is also required to generate the initial mask value, there is proposed a method of preventing the start of the cipher processing of the block from being delayed by additionally preparing a cipher processing circuit for generating the initial mask value.

Adding the cipher processing circuit for generating the initial mask value increases the circuit scale. If the circuit scale is limited, it is difficult to increase the speed.

SUMMARY OF THE INVENTION

In one aspect, an information processing apparatus comprising a plural number M (M≥2) of cipher processing units configured to perform, in a block order, either encryption processing or decryption processing for data of a series of blocks each having a predetermined data size and included in a data unit, wherein the plural number of cipher processing units perform either encryption or decryption for the data unit by repeating processing in the block order, and every time processing of a data unit starts, a first cipher processing unit configured to process data of an nMth (nM<N, N represents a block count) block in nth (n≥1) processing generates an initial mask value to be used for the encryption or the decryption.

According to the aspect, it is possible to prevent the start of encryption processing or decryption processing from being delayed without preparing a circuit for generating an initial mask value.

Further features of the present invention will become apparent from the following description of exemplary embodiments with reference to the attached drawings.

BRIEF DESCRIPTION OF THE DRAWINGS

FIGS. 5A and 5B are views each for explaining the operations of a plural number of block cipher encryption units.

DESCRIPTION OF THE EMBODIMENTS

Information processing according to an embodiment of the present invention will be described in detail below with reference to the accompanying drawings. An information processing apparatus that performs cipher processing based on the XTS-AES algorithm for a storage device will be exemplified below. The following embodiment is merely an example, and is not intended to limit the scope of the present invention. In addition, not all the combinations of features described in the embodiment are necessarily essential to the solving means of the present invention.

[Overview of XTS-AES Algorithm]

An overview of the XTS-AES algorithm will be described with reference to a block diagram shown in FIG. 1.

An AES encryption unit 101 is a cipher processor that uses the common key cryptosystem "AES", and outputs, as an initial mask value, the result of encrypting a tweak value (adjustment value or fine adjustment value) using Key2 as a key (second key).

A multiplier 102 outputs, as a mask value, the result of multiplying the initial mask value by $\alpha^j$. Note that $\alpha$ is a constant. A variable j is an integer indicating the ordinal number of, for example, a 128-bit block (to be simply referred to as a "block" hereinafter) of input data in a data unit. That is, if N (N>0) represents the total number of blocks of the data unit, j=0, 1, . . . , N−1 is defined. Multiplication performed by the multiplier 102 indicates polynomial multiplication over the binary field GF(2).

Note that data to be encrypted is divided into data units, and undergoes cipher processing for each block of each data unit.

An XOR 103 performs an exclusive OR operation for each bit, and outputs the exclusive OR value of the mask value and block data. An AES processor 104 is a cipher processor that uses the common key cryptosystem "AES", and performs cipher processing for the output of the XOR 103 using Key1 as a key (first key). An XOR 105 performs an exclusive OR operation for each bit, and outputs the exclusive OR value of the mask value and the output of the AES processor 104 as the encrypted data of the block data.

[Arrangement of Apparatus]

Figure 2:
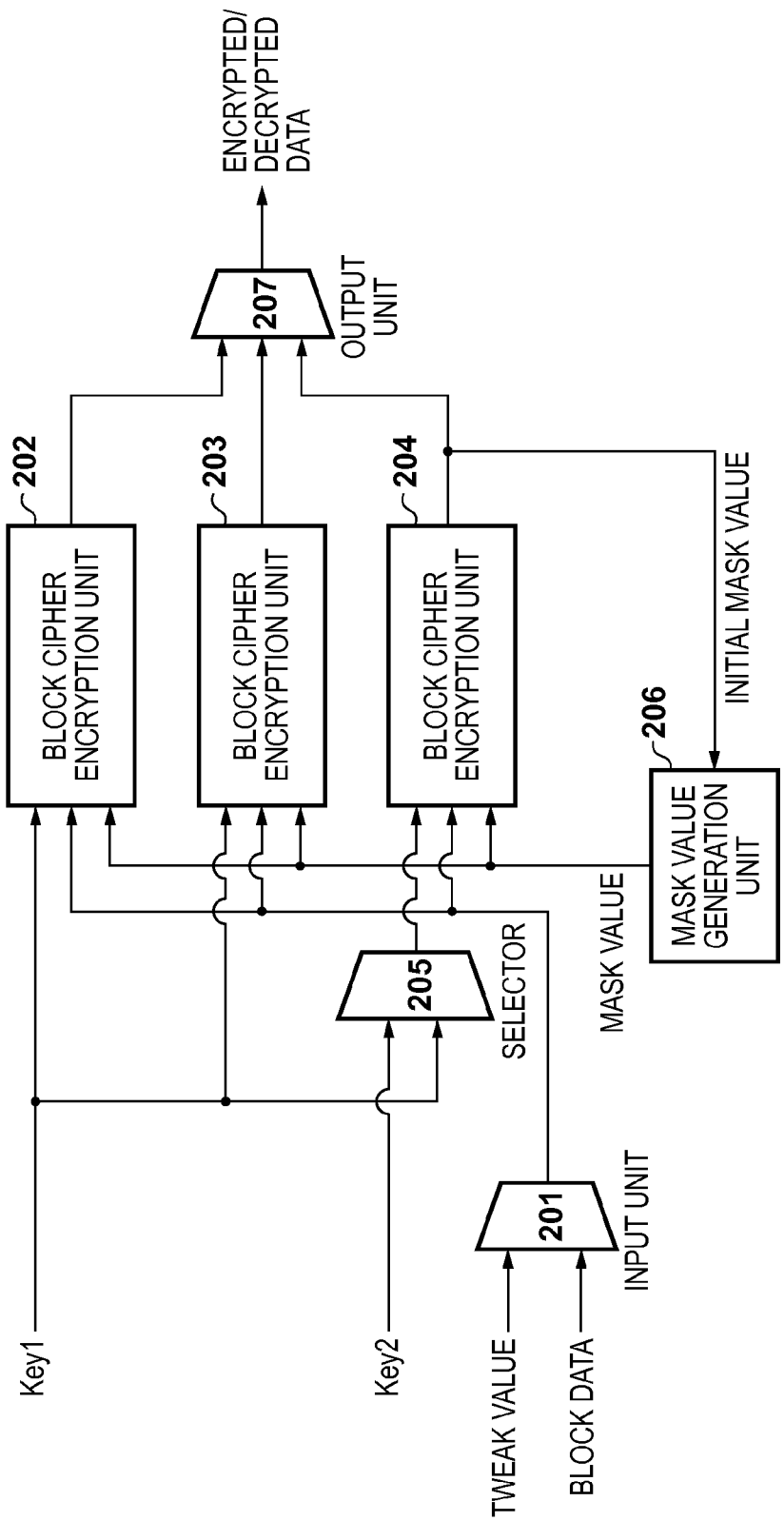
FIG. 2 is a block diagram showing the arrangement of the cipher processor of an information processing apparatus according to an embodiment.

FIG. 2 is a block diagram showing the arrangement of an information processing apparatus that performs cipher processing according to the embodiment.

An input unit 201 receives a tweak value and block data. A plural number of block cipher encryption units sequentially receive the block data continuously output from the input unit 201, and perform encryption processing or decryption processing.

In this embodiment, a case in which the number M of block cipher encryption units is 3 will be explained. That is, block cipher encryption units 202, 203 and 204 encrypt or decrypt, in the block order, the series of data output from the input unit 201. Note that when performing decryption processing, the plural number of block cipher encryption units function as a plural number of block cipher decryption units. Note that the plural number of block cipher encryption units will be described in detail later.

Among the plural number of block cipher encryption units, the block cipher encryption unit 204 generates an initial mask value based on the tweak value selectively input from the input unit 201. When processing of the data unit starts (the block cipher encryption unit 204 encrypts the tweak value), a selector 205 selectively outputs Key2. On the other hand, when the block cipher encryption unit 204 processes the block data, the selector 205 selectively outputs Key1.

Figure 1:
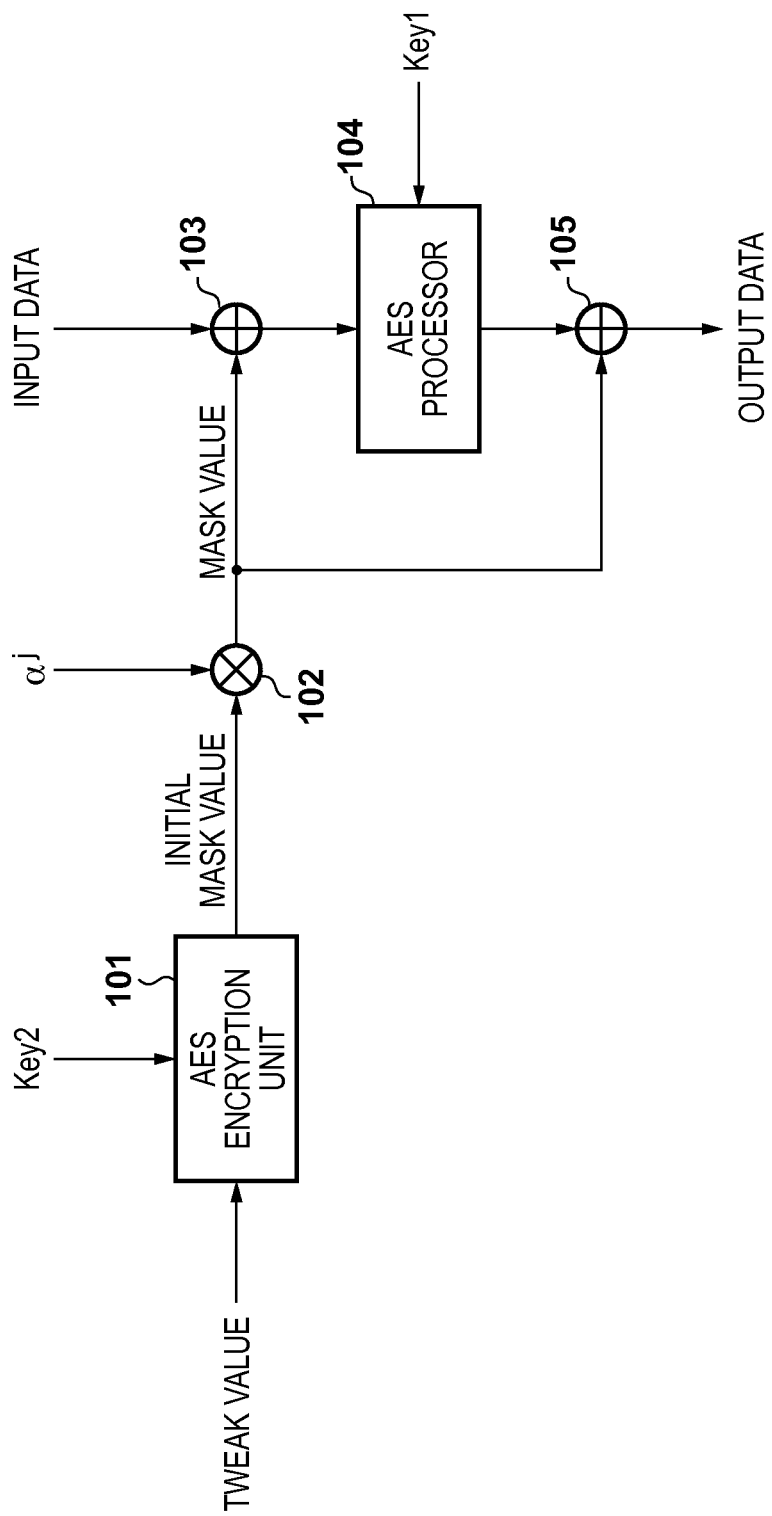
FIG. 1 is a block diagram for explaining an overview of the XTS-AES algorithm.

A mask value generation unit 206 receives the initial mask value generated by the block cipher encryption unit 204, and performs multiplication corresponding to the multiplier 102 shown in FIG. 1. The mask value generation unit 206 outputs 0 (zero) as a mask value at the time of start of processing of the data unit (at the time of encryption of the tweak value by the block cipher encryption unit 204), and outputs a mask value corresponding to a block at the time of processing of the block data. Details of this processing will be described later. Furthermore, an output unit 207 outputs the encrypted data or decrypted data of the block data in the block order.

Block Cipher Encryption Unit

Figure 3:
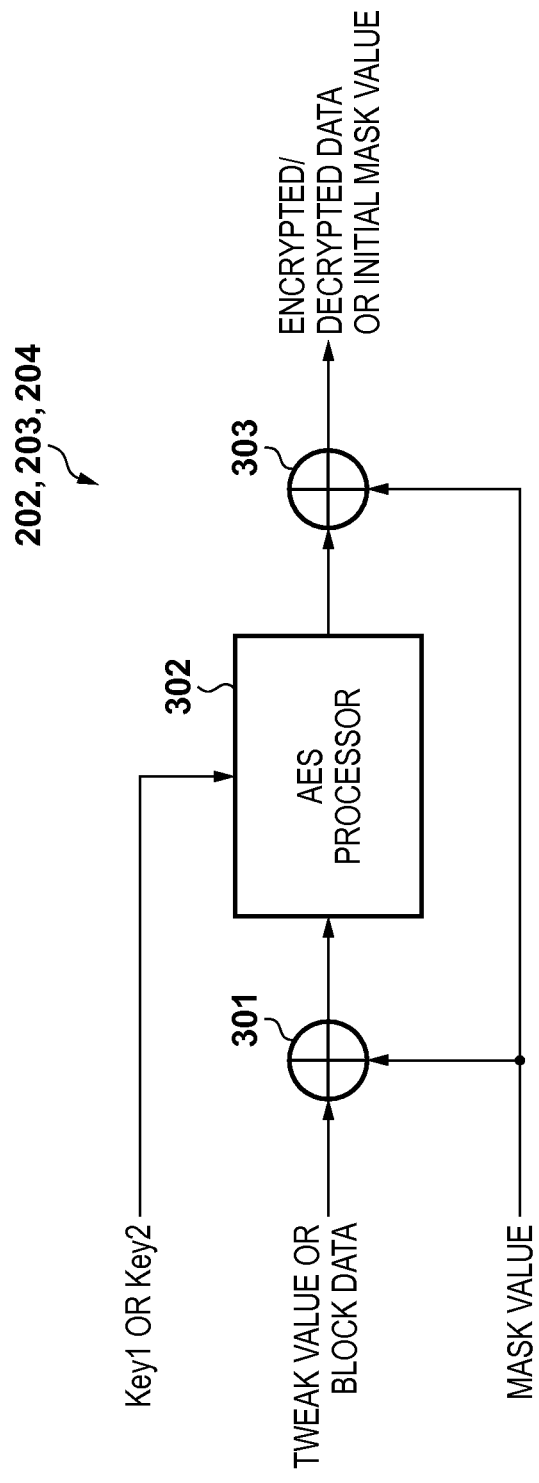
FIG. 3 is a block diagram showing the arrangement of a block cipher encryption unit.

FIG. 3 is a block diagram showing the arrangement of the block cipher encryption unit. Note that the plural number of block cipher encryption units have the same arrangement, and FIG. 3 shows only the arrangement of one block cipher encryption unit.

An XOR 301 is an operator for performing an exclusive OR operation for each bit. That is, the XOR 301 performs an exclusive OR operation corresponding to the XOR 103 shown in FIG. 1, and performs an exclusive OR operation of the input data and the mask value. Note that if the tweak value is input from the input unit 201 to the block cipher encryption unit, the mask value input from the mask value generation unit 206 is 0 (zero). Therefore, the XOR 301 outputs the input tweak value intact.

An AES processor 302 performs encryption processing or decryption processing by the common key cryptosystem (for example, the AES algorithm) using Key1 or Key2 as a key. When processing the tweak value, Key2 is input from the selector 205, and thus the AES processor 302 generates an initial mask value by encrypting the tweak value using Key2. On the other hand, when processing the block data, Key1 is input from the selector 205 or directly input, and thus the AES processor 302 uses Key1 to perform encryption processing or decryption processing for the exclusive OR value output from the XOR 301.

An XOR 303 is an operator for performing an exclusive OR operation for each bit. That is, the XOR 303 performs an exclusive OR operation corresponding to the XOR 105 shown in FIG. 1, and performs an exclusive OR operation of the mask value and data output from the AES processor 302. Note that if the tweak value is input from the input unit 201 to the block cipher encryption unit, the mask value input from the mask value generation unit 206 is 0 (zero). Therefore, the XOR 303 outputs intact the initial mask value output from the AES processor 302.

Mask Value Generation Unit

Figure 4:
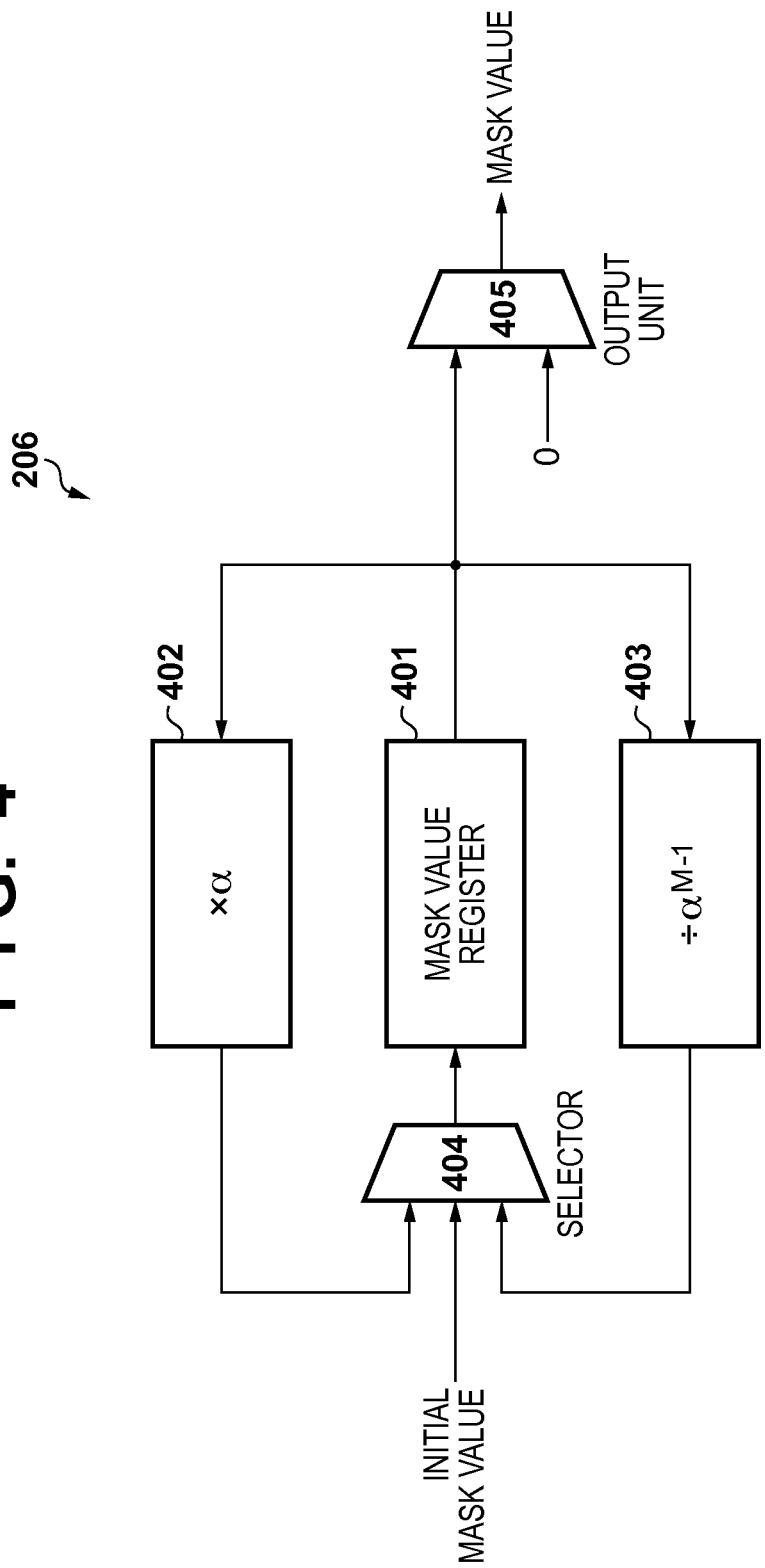
FIG. 4 is a block diagram showing the arrangement of a mask value generation unit.

FIG. 4 is a block diagram showing the arrangement of the mask value generation unit 206.

A selector 404 selectively outputs the initial mask value generated by the block cipher encryption unit 204 to a mask value register 401 at the time of start of processing of the data unit. Except for the time of start of processing of the data unit, the selector 404 selectively outputs the output of a multiplication unit 402 or the output of a division unit 403 to the mask value register 401. The mask value register 401 holds the mask value input from the selector 404.

The multiplication unit 402 corresponds to the multiplier 102 shown in FIG. 1, and outputs the result of multiplying the value held in the mask value register 401 by the constant $\alpha$ as a mask value to the selector 404 for each processing of the block data by the XOR 301 or each processing by the XOR 303. The selector 404 outputs the mask value input from the multiplication unit 402 to the mask value register 401, and causes the mask value register 401 to hold the mask value having undergone multiplication. An output unit 405 outputs the mask value held in the mask value register 401 as a mask value for processing of the block data by the XOR 301 or processing by the XOR 303.

The reason why the multiplication unit 402 corresponds to the multiplier 102 will be described. The multiplier 102 multiplies the initial mask value by $\alpha^j$, and the value j (0 to N−1) is counted up for each block. Therefore, it is possible to obtain a mask value for processing of the next block data by multiplying, by the constant $\alpha$, the mask value for processing of the previous block data, which is held in the mask value register 401.

On the other hand, upon completion of processes by all the XORs 301 of the plural number M of block cipher encryption units, the division unit 403 outputs, as a mask value, the result of dividing the value held in the mask value register 401 by $\alpha^{M-1}$. The selector 404 outputs, to the mask value register 401, the mask value input from the division unit 403, and causes the mask value register 401 to hold the mask value having undergone division.

The reason why the division unit 403 is necessary will be described. Processing of each of the block cipher encryption units 202 to 204 includes two exclusive OR operations, and the same mask value is required for both the exclusive OR operations. On the other hand, for example, the first exclusive OR operations for blocks 0, 1, and 2 require mask values multiplied by $\alpha^0$, $\alpha^1$, and $\alpha^2$, respectively, and the mask value held in the mask value register 401 is updated. As a result, at the time of the second exclusive OR operation, it is necessary to return the mask value held in the mask value register 401 to that at the time of the first exclusive OR operation.

In the arrangement shown in FIG. 2, the processes of the XORs 301 of the block cipher encryption units 202 to 204 count up the value j for three blocks. When the XOR 303 of the block cipher encryption unit 202 performs processing, a mask value used when the XOR 301 of the block cipher encryption unit 202 performs processing, that is, a mask value corresponding to the second previous value j is necessary. For this reason, the division unit 403 divides the mask value by the constant $\alpha$ M−1 times (in FIG. 2, M−1=2, that is, twice), and the mask value held in the mask value register 401 is returned to the mask value used when the XOR 301 of the block cipher encryption unit 202 performs processing.

After the division unit 403 performs division by $\alpha^{M-1}$, the multiplication unit 402 multiplies the mask value held in the mask value register 401 by a for each processing of the XOR 303, and the mask value held in the mask value register 401 is updated by a mask value corresponding to a block to be processed, as a matter of course.

The output unit 405 selectively outputs the mask value held in the mask value register 401 at the time of processing of the block data, and outputs 0 (zero) as a mask value at the time of encryption of the tweak value, as described above.

Operation of Block Cipher Encryption Processing

The operations of the block cipher encryption units 202 to 204 will be described with reference to FIGS. 5A and 5B.

Upon start of processing of a data unit, the block cipher encryption unit 204 performs calculation of the initial mask value (encryption 501 of the tweak value of FIG. 5A). Upon completion of calculation of the initial mask value, the block cipher encryption unit 202 processes a block with j=0. At the same time, the block cipher encryption unit 203 processes a block with j=1, and the block cipher encryption unit 204 processes a block with j=2. In this way, encryption processing or decryption processing is performed in the block order.

The block cipher encryption units 202 to 204 repeat the processing in the block order, thereby completing processing of 32 blocks (in other words, encryption processing or decryption processing of the data unit). Subsequently, processing of the next data unit starts, and the block cipher encryption unit 204 performs calculation of the initial mask value (encryption 502 of the tweak value).

If the repetition count of the processing in the block order is n (n≥1), the block cipher encryption unit 204 processes the data of the nMth block. Every time processing of a data unit starts, the block cipher encryption unit 204 generates the initial mask value of the XTS-AES algorithm.

If the block count N of the data unit can be divided by the number M of block cipher encryption units (N is a multiple of M, nM≤N), the block cipher encryption unit 204 performs processing of the block data of the last block (to be referred to as an "end block" hereinafter) of the data unit. In this case, upon end of the processing of the block data of the end block, the block cipher encryption unit 204 starts to generate an initial mask value for the next data unit. Since the block cipher encryption units 202 and 203 cannot start processes until generation of the initial mask value ends, the start of encryption processing or decryption processing is delayed by the time required for the processing of the block data.

FIG. 5A shows an example in which 32 blocks exist in one data unit (that is, N=32). In this case, the block count N of the data unit is not exactly dividable by the number M of block cipher encryption units (N is not a multiple of M, nM<N), and the block cipher encryption unit 203 processes the block data of the end block. Since the block cipher encryption unit 204 need not process the block data of the end block, it immediately starts to generate the initial mask value for the next data unit. Consequently, the start of encryption processing or decryption processing is never delayed.

FIG. 5B shows an example of the operations of the block cipher encryption units 202 to 204 when the data unit has a size of 4096 bytes. This example corresponds to a case in which cipher processing is performed by setting a sector of a storage device as a data unit. The block count N of the data unit is 256. In this example, the block cipher encryption unit 202 processes the block data of the end block, and the block cipher encryption unit 203 is set in an idle state. Therefore, the efficiency is slightly low, as compared with the example of FIG. 5A. However, the block cipher encryption unit 204 can immediately start to generate the initial mask value for the next data unit, and the start of encryption processing or decryption processing is never delayed.

That is, if the block cipher encryption units, the number M of which cannot exactly divide the block count N of the data unit, are prepared, it is possible to prevent the start of encryption processing or decryption processing from being delayed. In other words, the number M of block cipher encryption units is set not to be a multiple of the block count N. Furthermore, as shown in FIG. 5A, a remainder obtained by dividing the block count N by the number M of block cipher encryption units is preferably 1.

As described above, the plural number M (M≥2) of block cipher encryption units process, in the block order, the block data of a series of blocks each having a predetermined data size (for example, 128 bits) and included in a data unit. That is, the plural number of block cipher encryption units repeat the processing in the block order, thereby performing encryption processing or decryption processing for the data unit. In this case, the block cipher encryption unit that processes the data of the nMth (nM<N) block in the nth processing generates the initial mask value of the XTS-AES algorithm every time processing of a data unit starts.

As described above, in the information processing apparatus that performs encryption processing or decryption processing based on the XTS-AES algorithm, it is not necessary to additionally prepare a circuit for generating an initial mask value, and it is possible to prevent the start of encryption processing or decryption processing from being delayed due to generation of the initial mask value. Therefore, it is possible to improve the throughput of encryption processing while preventing the circuit scale from increasing.

Modification of Embodiment

The arrangement to which the aforementioned embodiment is applied has been explained above by assuming the XTS-AES algorithm. The aforementioned embodiment, however, is applicable to another algorithm for performing block encryption processing of generating an initial mask value by encrypting a tweak value, in addition to the XTS-AES algorithm. An example of the algorithm is XEX (Xor-encrypt-xor).

In the aforementioned embodiment, a case in which the block cipher encryption unit 204 generates the initial mask value has been described. However, instead of generating the initial mask value by one block cipher encryption unit (for example, the block cipher encryption unit 204), the initial mask value may be generated using two or more block cipher encryption units.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-004611, filed Jan. 14, 2014 and 2014-234910, filed Nov. 19, 2014, which are hereby incorporated by reference herein in their entirety.

What is claimed is:

1. An information processing apparatus comprising:
    a plural number M (M≥2) of cipher processing units configured to perform, in a block order, either encryption processing or decryption processing for data of a series of blocks each having a predetermined data size and included in a data unit,
    wherein the plural number M of cipher processing units perform either encryption or decryption processing for the data unit by repeating processing in the block order, and every time processing of the data unit starts, a first cipher processing unit configured to process data of an nMth (nM<N, N represents a block count) block in nth (n≥1) processing generates an initial mask value to be used for the encryption or the decryption, and
    wherein the first cipher processing unit is one of the plural number M of cipher processing units.

2. The apparatus according to claim 1, further comprising an input unit configured to receive a tweak value for generating the initial mask value and the data of the series of blocks, and output the tweak value to the first cipher processing unit while outputting the data of the series of blocks to the plural number M of cipher processing units,
    wherein the plural number M of cipher processing units sequentially receive the data of the series of blocks output by the input unit.

3. The apparatus according to claim 1, further comprising a first selection unit configured to selectively output one of a first key of a common key cryptosystem and a second key for generating the initial mask value to the first cipher processing unit.

4. The apparatus according to claim 3, further comprising a generation unit configured to generate, based on the initial mask value, a mask value to be used for either encryption processing or decryption processing of data of each block.

5. The apparatus according to claim 4, wherein each of the plural number of cipher processing units comprises:
    a first operator configured to operate an exclusive OR value of input data and the mask value;
    a cipher processor configured to perform either encryption processing or decryption processing for the exclusive OR value using either the first key or the second key; and
    a second operator configured to operate an exclusive OR value of the mask value and an exclusive OR value on which either the encryption processing or the decryption processing is performed.

6. The apparatus according to claim 5, wherein the generation unit comprises:
    a holding unit configured to hold a mask value;
    a multiplication unit configured to calculate a mask value by multiplying the mask value held in the holding unit by a constant;
    a division unit configured to calculate a mask value by dividing the mask value held in the holding unit by the constant M−1 times;
    a second selection unit configured to select, as a mask value to be stored in the holding unit, one of the initial mask value, the mask value calculated by the multiplication unit, and the mask value calculated by the division unit; and
    an output unit configured to output zero as the mask value at the time of start of the processing of the data unit, and to output, as the mask value, the mask value held in the holding unit at a time of the processing in the block order.

7. The apparatus according to claim 6, wherein the multiplication unit performs the multiplication for each operation of the first operator or each operation of the second operator.

8. The apparatus according to claim 6, wherein the division unit performs the division after the operations of all the first operators of the plural number of cipher processing units end.

9. The apparatus according to claim 6, wherein the second selection unit stores the initial mask value in the holding unit at the time of start of the processing of the data unit, and updates, for each processing in the block order, the mask value held in the holding unit by one of the mask value calculated by the multiplication unit and the mask value calculated by the division unit.

10. The apparatus according to claim 1, further comprising an output unit configured to output, in the block order, data on which either the encryption processing or the decryption processing is performed by the plural number of cipher processing units.

11. The apparatus according to claim 1, wherein each of the plural number of cipher processing units performs either encryption processing or decryption processing by a common key cryptosystem.

12. The apparatus according to claim 1, wherein the block count N is not a multiple of the plural number M.

13. The apparatus according to claim 1, wherein a remainder obtained by dividing the block count N by the plural number M is 1.

14. The apparatus according to claim 1, wherein the encryption processing and the decryption processing are encryption processing and decryption processing for a storage device, respectively.

15. The apparatus according to claim 1, wherein the encryption processing and the decryption processing are respectively encryption processing and decryption processing based on either an Xor-encrypt-xor (XEX) algorithm or an XEX-based tweaked-codebook mode with ciphertext stealing-Advanced Encryption standard (XTS-AES) algorithm.

16. A method of an information processing apparatus comprising a plural number M (M≥2) of cipher processing units configured to perform, in a block order, either encryption processing or decryption processing for data of a series of blocks each having a predetermined data size and included in a data unit, the method comprising:
    performing either encryption or decryption for the data unit by repeating processing in the block order by the plural number M of cipher processing units; and
    generating, every time processing of the data unit starts, an initial mask value to be used for the encryption or the decryption by a first cipher processing unit configured to process data of an nMth (nM<N, N represents a block count) block in nth (n≥1) processing, and wherein the first cipher processing unit is one of the plural number M of cipher processing units.

\* \* \* \* \*